Jan. 11, 1927.

T. U. WHITE ET AL 1,614,222

METERING SYSTEM

Filed Nov. 15, 1924

Fig. 2.
Station 1.

WITNESSES:

INVENTORS
Thomas U. White &
John E. Gardner
BY
ATTORNEY

Jan. 11, 1927.　　T. U. WHITE ET AL　　1,614,222

METERING SYSTEM

Filed Nov. 15, 1924　　4 Sheets-Sheet 3

Fig. 3.
Station 2

WITNESSES:

INVENTORS
Thomas U. White &
John E. Gardner
BY
ATTORNEY

Jan. 11, 1927.   T. U. WHITE ET AL   1,614,222
METERING SYSTEM
Filed Nov. 15, 1924    4 Sheets-Sheet 4

Fig. 4.

WITNESSES:

INVENTORS
Thomas U. White &
John E. Gardner
BY
ATTORNEY

Patented Jan. 11, 1927.

1,614,222

UNITED STATES PATENT OFFICE.

THOMAS U. WHITE, OF PITTSBURGH, AND JOHN E. GARDNER, OF WILKINSBURG, PENNSYLVANIA, ASSIGNORS TO WESTINGHOUSE ELECTRIC & MANUFACTURING COMPANY, A CORPORATION OF PENNSYLVANIA.

METERING SYSTEM.

Application filed November 15, 1924. Serial No. 750,070.

Our invention relates, in general, to electrical metering systems.

One of the objects of our invention is to provide means whereby a plurality of meter indications may be sent over a single circuit extending between two electrical stations or between an electrical station and a dispatcher's office.

Another object of our invention is to provide selecting means consisting wholly of relays for associating the different meters with a single circuit.

Another object of our invention is to utilize these selecting relays for sending indications from a plurality of meters located at remotely-disposed stations to a central office or dispatcher's station.

Another object of our invention is to provide a driving or impulsing circuit whereby groups of relays at the central station and remote station may be operated synchronously at high speed so that, to all intents and purposes, the single circuit is individual to predetermined meters.

A further object of our invention is to provide a totalizing means at the central station whereby all the meter indications are totalized.

A still further object of our invention is to provide means for sending an indication of the totalized quantity to the remote station or stations, as the case may be.

There are other objects of the invention which, together with those described above, will be brought out in the detailed description which is to follow when taken in conjunction with the accompanying drawings.

Referring now to the drawings comprising Figures 1 to 4, inclusive, sufficient circuits and apparatus have been shown, by means of the conventional diagrams, to enable our invention to be readily explained and understood. The apparatus and circuits shown in Figs. 1 and 2 are those located at the central station. The apparatus and circuits shown in Figs. 3 and 4 are those located in the remote substation. The apparatus and circuits within the dotted rectangle in the lower left-hand corner of Fig. 4 are in another remote station.

In practicing our invention, we provide a group or chain of counting relays at the dispatcher's office and a group or chain of counting relays, corresponding in number, at the remote substation. Associated with each group of counting relays is a group of selecting relays. There is a signalling device provided for each selecting relay. The selecting relays are adapted to be operated by the operation of the counting relays. The operation of the selecting relays serves to connect the different meters in proper sequence at both the station and office to the signalling circuit. A driving circuit is also provided at the dispatcher's office and substation for controlling the operation of the counting relays. A key is so associated with each selecting relay as to interrupt the functioning of the driving circuit in a manner that will appear.

Briefly, the operation proceeds as follows: The driving circuit is continuously operated to bring about the operation of the counting relays at the office and station in a predetermined sequence. The counting relays, in operating, cause the energization of the associated selecting relays in the same sequence. The operation of a selecting relay serves to connect a sending meter at the substation to a corresponding receiving meter at the dispatcher's office. This meter is operated in accordance with the operation of the sending meter to record the quantity measured by such sending meter. The operation of each selecting relay similarly connects the corresponding sending and receiving meters in a definite sequence to the signalling circuit. The various recording meters at the dispatcher's office cause the operation of the totalizing meter. The operation of this totalizing meter is indicated by a totalizing meter at the substation. These two meters are connected to the signalling circuit by the operation of the selecting relays.

It is possible to permanently associate a predetermined receiving meter at the office with a corresponding sending meter at the substation. This result is accomplished by depressing the key associated with the desired receiving meter.

Figure 1:
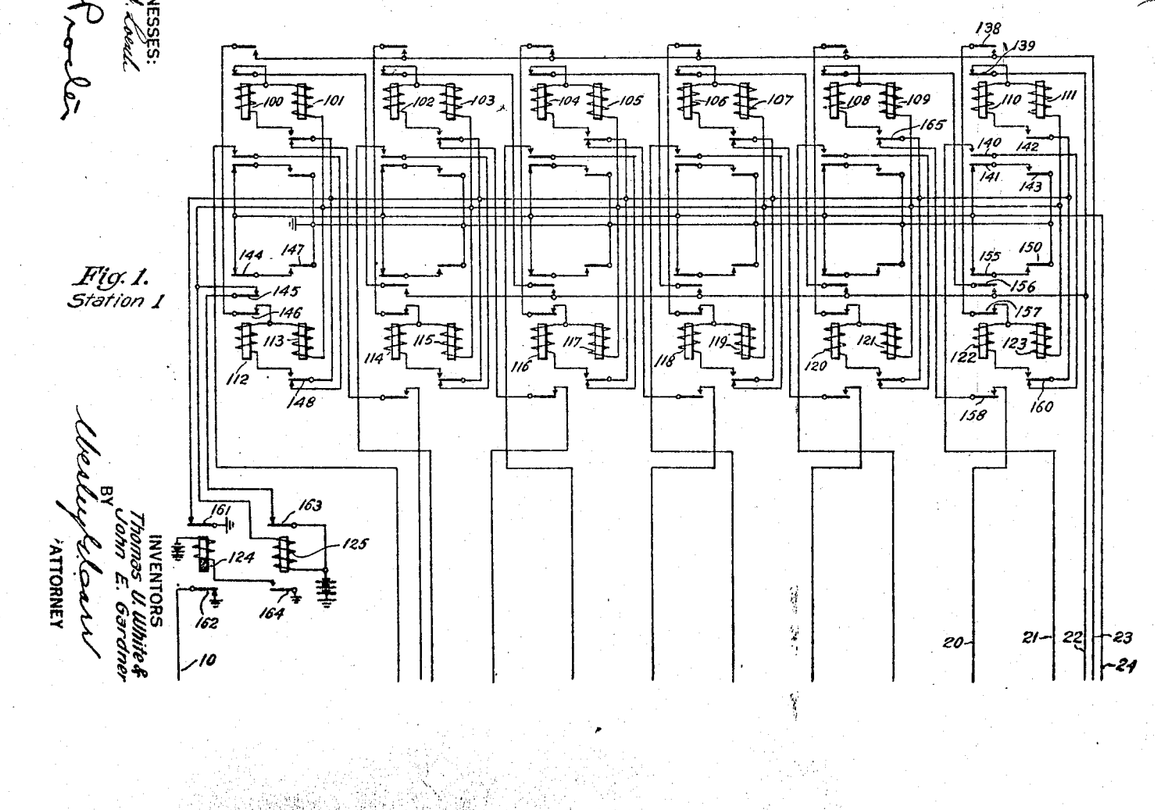

Referring now to the drawings, in Fig. 1, relays 100 to 123, inclusive, are of the usual type and constitute the chain of counting relays at the dispatcher's office. Relays 124 and 125 control certain releasing operations.

Figure 2:
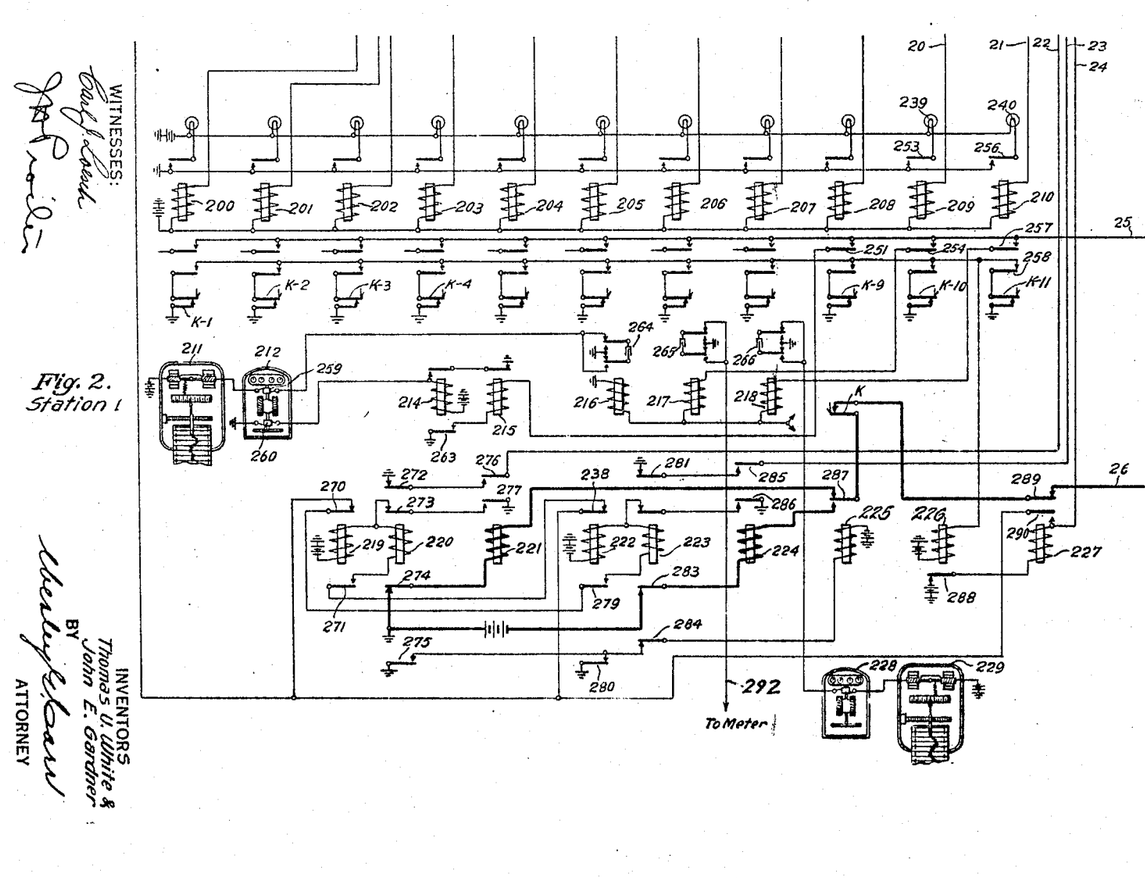

In Fig. 2, relays 200 to 210, inclusive, comprise the group of selecting relays at the dispatcher's office. Keys K—1 to K—11, inclusive, are of the well known single-throw, locking type and are provided for the purpose of interrupting the action of the driving circuit. At 212 is indicated a receiving meter that may be of the type shown in French Patent 587,306 published April 16, 1925. The meter 211 is a graphic recording meter of the Kelvin-balance type, the movable coils of which have very high inertia. This meter is calibrated to record the instantaneous fluctuation of the load on account of the time elapsing in successive impulses which may be several seconds on low loads. The meter 211 is thus somewhat retarded in response to changes in load. It is possible to obtain this result because of the high inertia of the moving parts and the small forces involved. The retardation of the meter 211 is an advantage in this case because it renders the graphic record more legible and the maximum and minimum values are accurately measured. The meter 229 is similar to the meter 211. The meter 212, in addition to responding to current impulses in the manner described, is provided with a commutator 260 which is adapted to interrupt the circuit including the relay 214 at a speed proportional to the number of impulses traversing armature 259. Relays 214 and 215 are of the usual type and control the impulse-sending operation of the meter 212. The relays 216 to 218, inclusive, control the operation of the meters 212 and 228. The meter 228 is similar to the meter 212 with the exception that it is not provided with a commutator. Relays 219 to 227, inclusive, comprise the driving circuit at the dispatcher's office. Lamps such as 239 and 240 indicate the position of the distributor at any instant.

Figure 3:
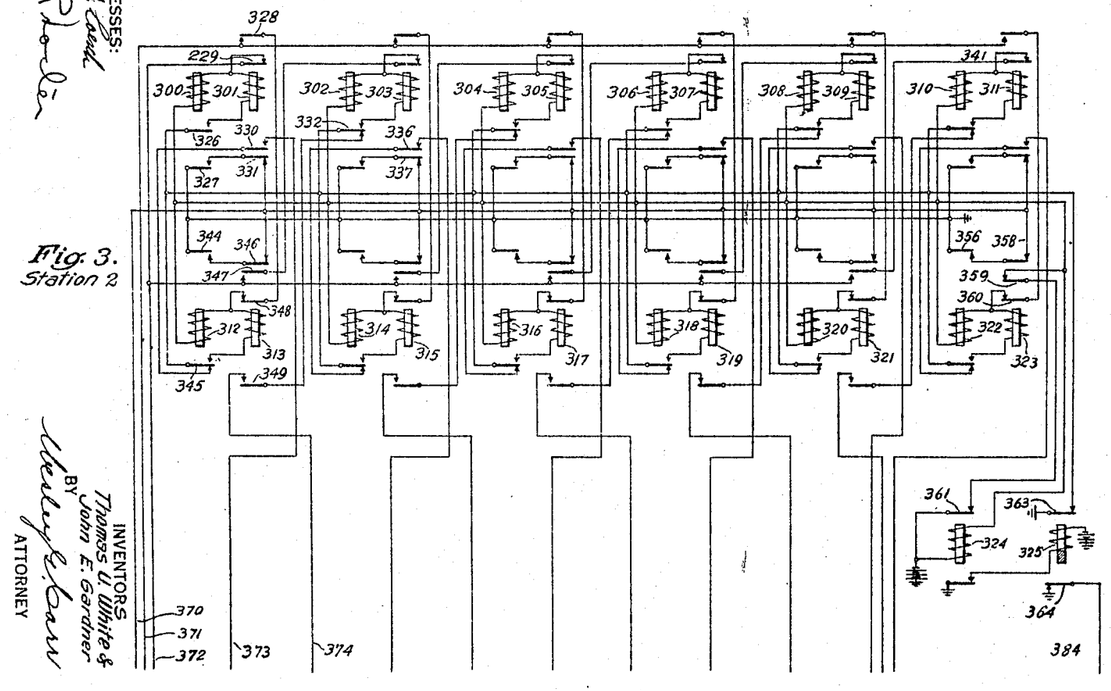

In Fig. 3, relays 300 to 323, inclusive, comprise the counting relay group at the substation. Relays 324 and 325 control the releasing operations of the apparatus at the substation.

Figure 4:
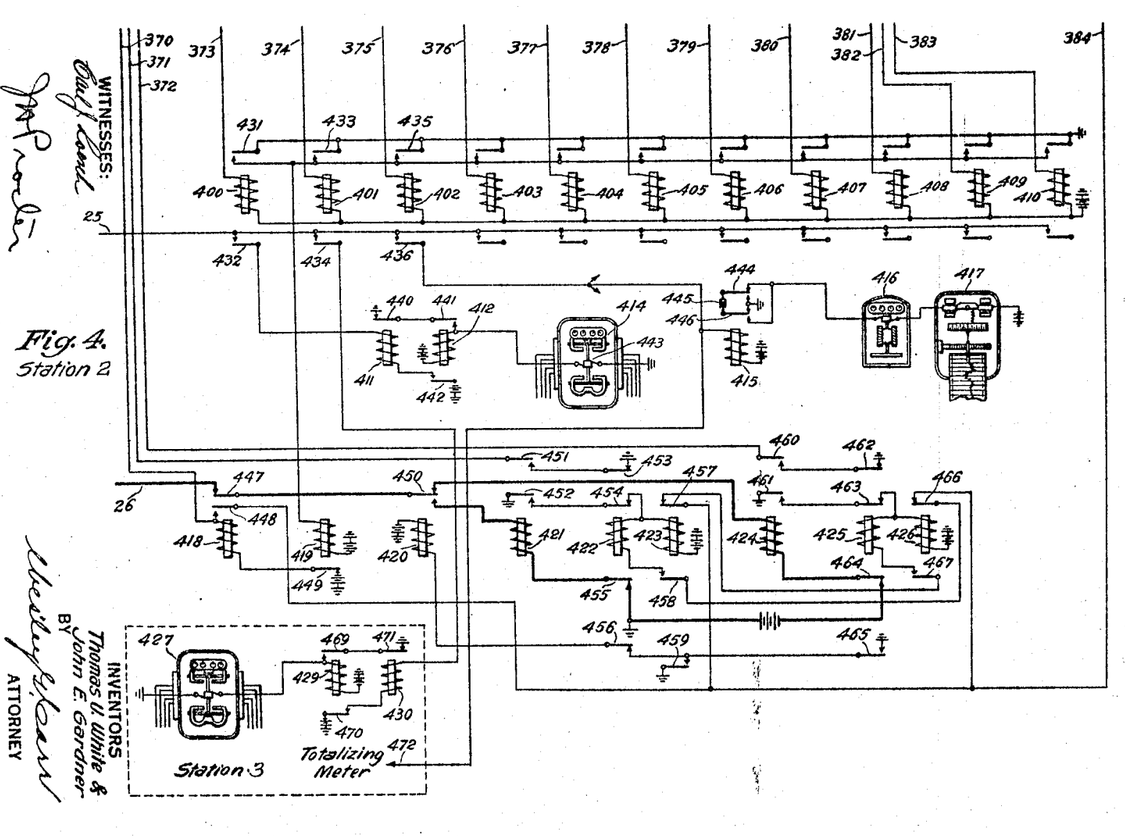

Relays 400 to 410, inclusive, Fig. 4, comprise the group of selecting relays at the substation. The meters 414 and 427 may be of any ordinary type and are provided with commutators 443 to 468, respectively, that are adapted to send impulses. The construction of these meters has been described fully in the above mentioned copending application. The receiving meter 416 and the graphic recording meter 417 are similar to the meters 228 and 229, respectively. Relays 418 to 426, inclusive, constitute the driving circuit at the substation. Relays 429 and 430 are associated with the sending meter 427. Relays 411 and 412 are associated with the sending meter 414. Relay 415 is associated with the totalizing meter 416.

In operating the apparatus, the driving circuit is operated continuously to bring about the sequential operation of the counting relays at the dispatcher's office and substation, respectively. In order to initially start the operation of the driving circuit, the key K is closed by the dispatcher. Upon such opeartion, a circuit is completed that extends from ground by way of back contact and armature 274, relay 221, back contact and armature 287, the springs of key K, armature 289 and its back contact, conductor 26, back contact and armature 447, armature 450 and its back contact, line relay 424 and armature 464 and its back contact to battery. The line relays 221 and 424 are energized in series over this circuit.

The relay 221, upon operating, completes a circuit at armature 277 for the relay 219 and at armature 276 completes an impulsing circuit. The relay 219 is operated to open one point in the circuit of the relays 222 and 223 at armature 270 and to complete a circuit at armature 271 that extends from ground by way of back contact and armature 162, conductor 10, armature 238 and its back contact, armature 271 and its front contact, relay 220 and relay 219 to battery. The relay 220 is not energized over this circuit so long as the original energizing circuit for the relay 219 is closed.

The previously mentioned impulsing circuit extends from ground by way of back contact and armature 272, front contact and armature 276, conductor 22, armature 139 and its back contact, relay 111, back contact and armature 145, and back contact and armature 163 to battery. The relay 111 is energized over this circuit and, upon operating, completes a circuit at armature 142 that extends from ground by way of armature 161 and its back contact, armature 142 and its front contact, relay 110, relay 111, back contact and armature 145, and back contact and armature 163 to battery, and at armature 143 completes a circuit that extends from ground by way of said armature and its front contact, armature 141 and its back contact, conductor 24, relay 227, and armature 288 and its back contact to battery. The relay 227 is operated and establishes a locking circuit for itself at armature 290 and opens the driving circuit including the line relays 221 and 424 at armature 289.

The locking circuit for the relay 227 extends from ground by way of back contact and armature 162, conductor 10, armature 290 and its front contact and back contact and armature 288 to battery. When the driving circuit is opened, the relay 221 is de-energized to open the impulsing circuit at armature 276 and to remove the short-circuit from the relay 220 at armature 277.

The relay 220 is energized to open another point in the impulsing circuit at armature 272, to open another point in the original circuit of the relay 219 at armature 273, to open another point in the circuit of the line relay 221 at armature 274, and to complete a circuit at armature 275 for the relay 225. The relay 225 is energized to prepare a circuit at armature 287 for the line relay 224.

When the impulsing circuit is opened, the short-circuit is removed from the relay 110 and this relay is permitted to operate. Upon operating, the relay 110 at armature 139 opens another point in the original energizing circuit of the relay 111 at armature 139, prepares a circuit for the counting relay 133 at armature 138, opens the original energizing circuit of the relay 227 at armature 141, and at armature 140 completes the following circuit, from ground by way of armature 161 and its back contact, armature 160 and its back contact, armature 140 and its front contact, conductor 21 and selecting relay 210 to battery.

The selecting relay 210 is energized to complete the circuit of the signalling lamp 240 at armature 256, to connect the receiving relay 218 to the signalling circuit including the conductor 25 at armature 257, and to complete a circuit at armature 258 over a path that extends from ground by way of springs of key K—11, armature 258 and its front contact, and relay 226 to battery. The relay 226 is operated to open the locking circuit of the relay 227 and the relay 227 is deenergized to prepare one point in the driving circuit.

At the substation, the line relay 424 is operated to complete an impulsing circuit at armature 460 and to complete a circuit for the relay 426 at armature 461. The relay 426 is operated to open one point in the circuit of the relays 422 and 423 at armature 466, and to complete a circuit at armature 467 over a path extending from ground by way of back contact and armature 364, conductor 384, armature 457 and its back contact, armature 467 and its front contact, relay 425 and relay 426 to battery. This circuit is not effective so long as the original energizing circuit for the relay 426 is maintained.

The previously-mentioned impulsing circuit extends from ground by way of back contact and armature 462, front contact and armature 460, conductor 372, armature 329 and its back contact, counting relay 300, back contact and armature 359, and back contact and armature 361 to battery. The counting relay 300 is operated to complete a circuit that extends from ground by way of armature 327 and its front contact, armature 331 and its back contact, conductor 370, relay 418, and armature 449 and its back contact to battery, and to complete a circuit at armature 326 that extends from ground by way of armature 363 and its back contact, armature 326 and its front contact, relay 301, relay 300, back contact and armature 359, and back contact and armature 361 to battery. This circuit is not effective until the original energizing circuit of the relay 300 is opened in a manner which will appear hereinafter.

The relay 418, upon being energized, establishes a locking circuit for itself at armature 448 and at armature 447 opens another point in the driving circuit. The locking circuit of the relay 418 extends from ground by way of back contact and armature 364, conductor 384, armature 448 and its front contact, relay 418, and armature 449 and its back contact to battery.

When the driving circuit is opened, the line relay 424 is deenergized to open the previously-mentioned impulsing circuit at armature 460 and to remove the short-circuit from the relay 425 at armature 461. The relay 425 is operated to open another point in the impulsing circuit at armature 462, to open another point in the original circuit for the relay 426 at armature 463, and to open another point in the circuit of the relay 424 at armature 464.

Another result of the operation of the relay 425 is that at armature 465 a circuit is completed for the relay 420. The relay 420 is operated to connect the relay 421 to the driving circuit at armature 450.

When the impulsing circuit is opened, the short-circuit is removed from the relay 301 and this relay attracts its armatures to prepare a circuit for the relay 312 at armature 328, to open another point in the original energizing circuit of the relay 300 at armature 329, to open the original energizing circuit of the relay 418 at armature 331, and to complete a circuit at armature 330 over a path that extends from ground by way of armature 363 and its back contact, armature 345 and its back contact, armature 330 and its front contact, conductor 373 and selecting relay 400 to battery. The selecting relay 400 is energized to connect the sending meter 414 to the signalling circuit, including the conductor 25, at armature 432, and to complete a circuit at armature 431 that extends from ground by way of said armature and its front contact, and relay 419 to battery. The relay 419 is operated to open the locking circuit of the relay 418 which is deenergized. The relay 418 retracts its armature to complete the driving circuit.

The selecting relays 210 and 400 at the dispatcher's office and substation, respectively, are energized substantially simultaneously by the operation of the driving circuit in the manner described. By the energization of these relays, it will be seen that the sending meter 414 is connected from the conductor 25 to the receiving meter 228 and the graphic meter 229. The sending meter 414 is operated in accordance with the load of the circuit with which it is associated to interrupt the circuit of the relay 412. At the greatest load, the meter 414 will not interrupt the circuit of the relay 412 any oftener than four impulses a second.

When the relay 412 is energized after one of these interruptions, it operates to connect battery to one terminal of the relay 411 at armature 442 and to establish a loocking circuit for itself at armature 441. This sets up an impulse so that, when the selecting relay 400 at the substation and the selecting relay 210 at the dispatcher's office are operated in the manner described, there is a circuit completed that extends from battery by way of armature 442 and its front contact, relay 411, armature 432 and its front contact, signalling conductor 25, front contact and armature 257, relay 218 and common low resistance relay 216 to ground. Relays 216, 218 and 411 are energized over this circuit.

The relay 218, upon being operated, attracts its armatures so that the condenser 266 is connected to the circuit in a manner opposite to that in which it is normally connected when the relay is deenergized. This circuit includes the receiving meter 228 and the graphic meter 229. The condenser 266 is discharged over this circuit and this impulse is registered by the receiving meter 228 and the graphic meter 229 is operated.

The relay 216, upon operating, connects the condenser 264 to the circuit including the graphic meter 211 and the totalizing meter 212 in the manner opposite to that in which it is normally connected. The condenser 264 is discharged and the current impulse actuates the totalizing meter 212 and the graphic meter 211.

At the substation, the relay 411 is operated to open the locking circuit of the relay 412 at armature 440. The relay 412 is deenergized to open the circuit of the relays 411, 218 and 216. The relays 216 and 218 retract their armatures so that the condensers 264 and 266 are charged over the circuit including the meters 211 and 212 and 228 and 229, respectively.

The driving circuit now extends from battery by way of back contact and armature 283, line relay 224, front contact and armature 287, springs of key K, armature 289 and its back contact, trunk conductor 26, back contact and armature 447, armature 450 and its front contact, relay 421 and armature 455 and its back contact to ground. The line relay 224 is energized over this circuit and operates to complete an impulsing circuit at armature 285 and to complete a circuit for the relay 222 at armature 286.

The relay 222 is operated to open the circuit of the relays 219 and 220 at armature 238, to prepare a circuit for the relay 223 at armature 279, and to complete a circuit for the relay 225 at armature 280. The relay 220 is deenergized to prepare a circuit for the relay 219 at armature 273, to prepare a circuit for the line relay 221 at armature 274 and to open one point in the circuit of the relay 225 at armature 275. The relay 219 is deenergized to open one point in the circuit of the relay 220 at armature 271, and to complete a circuit that extends from ground upon grounded conductor 10 by way of back contact and armature 270, armature 279 and its front contact, relay 223 and relay 222 to battery. The relay 223 is not energized until the original circuit of the relay 222 is opened.

The impulsing circuit completed by the operation of the line relay 224 extends from ground by way of back contact and armature 281, armature and front contact 285, front contact and armature 138, armature 157 and its back contact, counting relay 123, back contact and armature 145, and back contact and armature 163 to battery. The counting relay 123 is energized over the above-traced circuit and operates to open the circuit of the selecting relay 210 at armature 160, to close a circuit for the relay 122 at the front contact of this armature, and to prepare a circuit for the relay 227 at armature 150.

The circuit of the relay 122 extends from ground by way of armature 161 and its back contact, armature 160 and its front contact, relay 122, relay 123, back contact and armature 145, and back contact and armature 163 to battery. This circuit is not effective to operate the relay 122 until the original circuit of the relay 123 is opened.

The selecting relay 210 is deenergized to open the circuit of the signalling device 240 at armature 256, to disconnect the relays 216 and 218 from the conductor 25 at armature 257 and to open the circuit of the relay 226 at armature 258. The relay 226 is deenergized to complete a circuit at armature 288 that extends from battery by way of back contact and said armature, relay 227, conductor 24, back contact and armature 155, and front contact and armature 159 to ground. The relay 227 is operated over this circuit and attracts its armature 290 to establish a locking circuit for itself and attracts its armature 289 to open the driving circuit.

When the driving circuit is opened, the relay 224 is deenergized to open the impulsing circuit at armature 285 and to remove the short-circuit from the relay 222 at armature 286. Upon operating, the relay 223 opens a second point in the impulsing circuit at armature 281, opens a second point in the circuit of the relay 222 at armature 282, at armature 283 opens a second point in the circuit of the relay 224, and at armature 284 opens the circuit of the relay 225.

The relay 225 retracts its armature to connect the line relay 221 to the driving circuit.

By the opening of the impulsing circuit, the relay 122 is permitted to energize. Upon operating, the relay 122 opens the original energizing circuit of the relay 227 at armature 155, prepares a circuit for the relay 109 at armature 156, opens another point in the circuit of the relay 123 at armature 157, and at armature 158 completes a circuit that extends from ground by way of armature 161 and its back contact, armature 165 and its back contact, armature 158 and its front contact, conductor 20, and selecting relay 209 to battery.

The selecting relay 209 is energized to complete the circuit of the signalling lamp 239 at armature 253, to connect the receiving relay 217 to the conductor 25 at armature 254, and to complete a circuit at armature 255 for the relay 226. The lighting of the signalling lamp 239 apprises the dispatcher of the selecting position of the relay apparatus. The relay 226 is operated to open the locking circuit of the relay 227 and this relay retracts its armature 289 to prepare one point in the driving circuit.

At the substation, the line relay 421, upon operating, completes an impulsing circuit extending to the counting relay chain at armature 451, and at armature 452 completes a circuit for the relay 423. The relay 423 is energized to open the circuit of the relays 425 and 426 at armature 457, to complete an additional circuit for the relay 420 at armature 459, and to prepare a circuit for the relay 422 at armature 458. The relay 425 is deenergized to prepare a circuit for the relay 426 at armature 463, and to prepare a circuit for the line relay 424 at armature 464. The relay 426 is deenergized to open an additional point in the circuit of the relay 425 at armature 467, and to complete a circuit at armature 466 over a path that extends from ground by way of back contact and armature 364, conductor 384, back contact and armature 466, armature 458 and its front contact, relay 422 and relay 423 to battery. The relay 422 is short-circuited as long as the original energizing circuit of the relay 423 is maintained.

The impulsing circuit extending to the counting relays may be traced from ground by way of back contact and armature 453, front contact and armature 451, conductor 371, front contact and armature 328, armature 348 and its back contact, counting relay 312, back contact and armature 359, and back contact and armature 361 to battery. The counting relay 312 is energized over the above circuit and operates to open the circuit of the selecting relay 400 at armature 345, to complete a circuit for the relay 313 at the front contact of this armature, and to prepare a circuit at armature 344 for the relay 418.

The circuit for the relay 313 extends from ground by way of armature 363 and its back contact, armature 345 and its front contact, relay 313, relay 312, back contact and armature 359 and back contact and armature 361 to battery. This circuit is not effective to energize the relay 313 until the original energizing circuit of the relay 312 is opened, the relay 313 being short-circuited.

The relay 400 is deenergized to open the circuit of the relay 419 at armature 431, and to disconnect the sending relay 411 from the signalling conductor 25 at armature 432. The relay 419 is deenergized to complete a circuit that may be traced from battery by way of back contact and armature 449, relay 418, conductor 370, back contact and armature 346 and front contact and armature 344 to ground. The relay 418 operates to establish a locking circuit for itself at armature 448 and to open the driving circuit at armature 447. By the latter operation, the line relay 421 is deenergized to open the impulsing circuit at armature 451 and to permit the energization of the relay 422 by removing the short-circuit therefrom at armature 452.

The relay 422 is immediately energized to open another point in the impulsing circuit at armature 453, to open an additional point in the circuit of the relay 423 at armature 454, to open an additional point in the circuit of the relay 421 at armature 455, and to open the circuit of the relay 420 at armature 456. The relay 420 retracts its armature to prepare a circuit for the line relay 424.

The opening of the impulsing circuit permits the relay 313 to energize and, as a result, the original energizing circuit of the relay 418 is opened at armature 346, a circuit is prepared for the counting relay 302 at armature 347, a second point in the circuit of the relay 312 is opened at armature 348, and a circuit is completed at armature 349 that may be traced from ground by way of armature 363 and its back contact, armature 332 and its back contact, armature 349 and its front contact, conductor 374 and selecting relay 401 to battery. The selecting relay 401 is operated to complete a circuit for the relay 419 at armature 433 and to connect the sending meter 427 to the signalling conductor 25 at armature 434. The relay 419 is immediately energized to open the locking circuit of the relay 418 at armature 449. The relay 418 is deenergized to complete the driving circuit.

The selecting relays 209 and 401 at the dispatcher's office and substation, respectively, are energized and, as a result, the sending meter 427 in station 3 is connected to the signalling conductor 25 and the receiving relay 217 is connected to conductor 25 at the dispatcher's office. If the relay 429 has been energized by the operation of the sending meter 427, a circuit will be completed extending from battery by way of armature 470 and its front contact, relay 430, armature 434 and its front contact, conductor 25, front contact and armature 254, relay 217 and relay 216 to ground. The relays 216, 217 and 430 are energized in series.

The relay 217 is operated to cause an impulse of current to be sent to the receiving meter that is connected to the conductor 292. The relay 216 is also operated to send an impulse of current to the totalizing recording meter 212 and the totalizing graphic meter 211. It may be noted that the relay 216 is common to the relay circuits and is energized each time one of the relays, such as 217 or 218, is operated. In this manner, an impulse of current is sent to the recording meter 212 and the graphic meter 211 each time an impulse of current is sent to one of the other individual meters. The meters 212 and 211 thus give a totalized reading.

The relay 430 at station 3 is operated to open the locking circuit of the relay 429 and this relay is deenergized to open the circuits of the relays 216, 217 and 430. These relays are deenergized with obvious results.

The driving circuit causes the alternate operation of the line relays 221 and 224 at the dispatcher's office and of the line relays 424 and 421 at the substation.

The operation of the relays 221 and 224 at the dispatcher's office causes the energization of the counting relays 109, 108, 121, 120, 107, 106, 119, 118, 105, 104, 117, 116, 103, 102, 115, 114, 101, 100, 113 and 112 in the sequence mentioned. The operation of the counting relays causes the energization of the selecting relays in the following sequence 208, 207, 206, 205, 204, 203, 202, 201 and 200. The operation of the selecting relays brings about the lighting of the signalling devices, such as 238, and the connection of the receiving meters to the signalling conductor in a definite sequence.

In like manner, at the substation, the alternate operation of the line relays 424 and 421 causes the energization of the counting relays 302, 303, 314, 315, 304, 305, 316, 317, 306, 307, 318, 319, 308, 309, 320, 321, 310, 311, 322 and 323 in the sequence mentioned. The operation of the counting relays causes the energization of the selecting relays in the following sequence 402, 403, 404, 405, 406, 407, 408, 409 and 410. The operation of the selecting relays causes the connection of sending meters, such as the meter 414, and the receiving meters, such as 416, to the signalling conductor 25 in a definite sequence. The action of these selecting relays takes place substantially in synchronism with the operation of the selecting relays at the dispatcher's office so that corresponding sending and receiving meters are connected to the signalling conductor 25 simultaneously.

When the selecting relays 208 and 402 at the dispatcher's office and substation, respectively, are energized, the totalizing recording meter 212 is connected to the signalling conductor 25 at the dispatcher's office and the totalizing receiving meter 416 is connected to this circuit at the substation. By the operation of the totalizing meter, the relay 214 is locked energized and a circuit is completed that extends from ground by way of armature 263 and its front contact, relay 215, armature 251 and its front contact, conductor 25, front contact and armature 436, and relay 415 to battery. The relay 415 is operated to send an impulse of current to the totalizing recording meter 416 and to the totalizing graphic meter 417. By the operation of these meters, the totalized reading is recorded and charted. The conductor 472 also extends to a totalizing meter in station 3 so that a record is made there of the totalized indication.

The remaining sending and receiving meters are operated in substantially the same manner as before described to send and record readings.

When the counting relay 113 is operated as a result of the energization of the line relay 224, the circuit of the selecting relay 200 is opened at armature 148, a circuit is completed for the relay 112 at the front contact of this armature, and at armature 147, a circuit is prepared for the relay 227. The selecting relay 200 is deenergized to open the circuit of the relay 226. This relay retracts its armature to complete a circuit for the relay 227. The relay 227 operates to establish a locking circuit for itself and to open the driving circuit. The latter operation causes the deenergization of the line relay 224. This is followed by the energization of the relay 223 and the energization of the relay 112. One of the results of the operation of the relay 223 is that the circuit of the relay 225 is opened and this relay retracts its armature to connect the line relay 221 to the driving circuit.

The counting relay 112, upon operating, opens another point in the circuit of the relay 113 at armature 146, opens the original energizing circuit of the relay 227 at armature 144, and at armature 145 removes the short-circuit from the relay 125, whereby this relay is energized in series with all the counting relays. The relay 125 attracts its armature 164 to complete a circuit for the slow-acting relay 124. The relay 124 is energized to remove ground from conductor 10 at armature 162 and to open the circuit of the counting relays 100 to 123, inclusive, and the circuit of the relay 125 at armature 161. By the latter operation, the relays 100 to 123, inclusive, retract their armatures to restore certain circuits to normal. The relay 125 is deenergized to open the circuit of the slow-acting relay 124. The relay 124 remains energized, however, for a short interval of time after this circuit has been opened.

By the removal of ground from conductor 10, the circuit of the relays 222 and 223 is opened as well as the locking circuit of the relay 227. The relays 222 and 223 retract their armatures, as does the relay 227, to restore certain other circuits to normal. The slow-acting relay 124 is finally deenergized to prepare locking circuits for the counting relays and for certain relays in the driving circuit.

In this manner, the apparatus is restored to normal at the dispatchers' office.

At the substation, when the counting relay 322 is energized, as a consequence of the operation of the line relay 421, the circuit of the selecting relay 410 is opened at armature 357, a circuit is completed for the relay 323 at the front contact of this armature, and a circuit is prepared at armature 356 for the relay 418. The relay 410 is deenergized to open the circuit of the relay 419. The relay 419 is deenergized to complete a circuit for the relay 418. The relay 418 operates to complete a locking circuit for itself at armature 448 and to open the driving circuit. The latter operation causes the deenergization of the relay 421 with the result that the short circuits are removed from the relays 323 and 422.

One of the results of the operation of the relay 422 is that the circuit of the relay 420 is opened. This relay retracts its armature to connect the relay 424 to the driving circuit. The relay 323, upon being energized, opens one point in the circuit of the relay 322 at armature 360, opens the original energizing circuit of the relay 418 at armature 358, and at armature 359 removes the short-circuit from the relay 324. The latter relay is now energized in series with the counting relays 300 to 323, inclusive.

Upon operating, the relay 324 completes a circuit for the slow-acting relay 325. The relay 325 is energized to open the circuits of the relays 300 to 324, inclusive, at armature 363, and to remove ground from the conductor 384 at armature 364. The relays 300 to 324, inclusive, retract their armatures to restore certain circuits to normal. By the removal of ground from conductor 384, the circuit of the relays 422 and 423 is opened, together with the locking circuit of the relay 418. These relays are deenergized with obvious results. The deenergization of the relay 324 opens the circuit of the slow-acting relay 325 and this relay retracts its armatures.

In the foregoing manner, all the apparatus at the substation is restored to normal.

The driving circuit effects the operation of the relay selecting apparatus in exactly the same manner as before described whereby successive meters are connected to the signalling circuit at high speed. By reason of the speed of operation of the selecting apparatus, it is possible to connect the various sending and receiving meters to the signalling circuit sufficiently fast that, to all intents and purposes, each sending meter is connected to its corresponding receiving meters by a separate circuit.

It will also be apparent that the sending and receiving meters may not be located in one substation but that the selecting apparatus may select meters in several substations. Of course, in this event it is necessary that a trunk circuit be extended to such substation for each meter the indication of which is desired.

Attention is directed to the fact that the driving circuit maintains the operation of the selecting relays in the same sequence at the dispatcher's office and substation. This is true by reason of the fact that the line relays at either point must be connected to the driving circuit alternately and that this is controlled by the conjoint action of the counting and selecting relays at each point.

The dispatcher is also provided with means whereby he may definitely select a predetermined meter and remain in connection with it so long as he desires. In order to describe the manner in which this result is accomplished, it will be assumed that the dispatcher desires to connect with the sending meter 414. To accomplish this result, the dispatcher will depress the key K—11. When the driving circuit has caused the operation of the selecting relays 210 and 400, its action will be interrupted by reason of the fact that the relay 227 is locked energized until the relay 226 is operated. The relay 226 cannot be operated until the key K—11 is released. The sending meter 414 is thus connected to the recording meter 211 and the integrating meter 212. When the key K—11 is released, the circuit of the relay 226 is completed and the driving circuit functions in the same manner as before described. By these provisions, the dispatcher may render the signalling circuit individual to any predetermined meter for any desired length of time.

While we have shown only one embodiment of our invention, in the accompanying drawings, it is capable of various changes and modifications without departing from the spirit thereof, and it is desired, therefore, that only such limitations shall be placed thereon as are imposed by the prior art or indicated in the appended claims.

We claim as our invention:

1. In an electrical measuring system, the combination with an office and a station, of a group of relays at said office and a group of relays at said station, means for operating the relays in each group in sequence and in synchronism with the other group, a plurality of measuring devices at said station, a plurality of recording devices at said office, a totalizing device at said office, means including said groups of relays for connecting said measuring devices to said recording devices in sequence, and means including said relay groups whereby said totalizing device is controlled by said measuring devices.

2. In an electrical measuring system, the combination with an office and a station, of a group of relays at said office, a group of relays at said station, a plurality of measuring devices at said station, a plurality of recording devices at said office, means controlled by the relays in said office for selecting any one of said recording devices, means controlled by the relays at said station for selecting any one of said measuring devices, means for maintaining electrical connections between said selections as long as desired and means including a driving circuit for operating the relays in each group in the same sequence.

3. In an electrical measuring system, the combination with an office and a station, of a group of relays at said office, a group of relays at said station, a plurality of measuring devices at said station, a totalizing device at said office, means including said relays whereby said measuring devices sequentially control said totalizing device, and means including a driving circuit for operating the relays in each group in a definite sequence.

4. In an electrical measuring system, the combination with an office and a plurality of stations, of a group of relays in said office and a group of relays in one of said stations, a plurality of meters in each of said stations, a plurality of recording devices at said office corresponding in number to the total number of meters, means controlled by the relays at said office for selecting one of said recording devices, means controlled by the relays in said station for selecting an equivalent meter and means including a driving circuit for operating the relays in each group in a predetermined sequence.

5. A metering system comprising a plurality of separated substations, meters in said substations, a totalizing device in each substation, a relay chain, means for operating said chain and means including said relays for actuating all of said totalizing devices in accordance with the sum of the meter indications.

6. A metering system comprising a plurality of substations, a dispatcher's office, meters in said substations, a circuit extending from each substation to said office, totalizing meters in said substations and said office, a relay chain at said office, means for operating said relays of said chain in a predetermined sequence and means including said relays for actuating said totalizing meters over said circuits in accordance with the sum of the readings of the first mentioned meters.

7. A metering system comprising a substation, a dispatcher's office, a circuit connecting said substation and said office, two meters at the substation, a third meter at the dispatcher's office, a chain of relays at said office and said station, means for operating said relays in synchronism in a predetermined sequence, means for actuating the last mentioned meter over predetermined contacts of said relays and over said circuit in accordance with the operation of one of the first-mentioned meters, and means for actuating the other of the first-mentioned meters over predetermined contacts of said relays and over said circuit in accordance with the operation of said third meter.

8. A metering system comprising a plurality of meters, a locking relay for each meter, a plurality of relay chains, means for operating the relays in each chain synchronously, a totalizing relay, means including the contacts of said chains of relays for successively unlocking said meter relays and operating said totalizing relay, and a totalizing device controlled by said totalizing relay.

9. A metering system comprising a plurality of individual meters, a totalizing meter, two relay chains, means for operating said relays in said chains in synchronism, means connected to said individual meters for actuating said totalizing means, a plurality of other meters and means including said relay chains, whereby said totalizing meter actuates said other meters.

10. A metering system comprising a plurality of substations, a dispatcher's office, integrating and indicating meters at said substations and office, means for actuating said meters at the dispatcher's office in accordance with said indicating meters, and for integrating said readings, said means including a chain of relays at said office and a chain of relays at a substation, means for operating said relays in synchronism for selectively associating said meters at said office and substation, and means for actuating the meters at each substation in accordance with the reading of said office meter.

In testimony whereof, we have hereunto subscribed our names this 11th day of November, 1924.

THOMAS U. WHITE.
JOHN E. GARDNER.